United States Patent [19]

James et al.

[11] Patent Number: 5,230,818
[45] Date of Patent: Jul. 27, 1993

[54] COATING COMPOSITIONS FOR MASTER MEDIA FOR ANHYSTERETIC RECORDING

[75] Inventors: Robert O. James; Harry J. Sherwood; Joseph A. Verdone, all of Rochester, N.Y.

[73] Assignee: Eastman Kodak Company, Rochester, N.Y.

[21] Appl. No.: 811,386

[22] Filed: Dec. 20, 1991

[51] Int. Cl.$^5$ .................. B22F 3/00; C04B 35/64; H01F 1/04
[52] U.S. Cl. ........................... 252/62.55; 252/62.54
[58] Field of Search ............... 427/127, 132, 48; 428/694, 695, 900; 257/62.54, 62.55

[56] References Cited

U.S. PATENT DOCUMENTS

| | | | |
|---|---|---|---|
| 3,873,461 | 3/1975 | Mollard et al. | 252/62 |
| 3,921,208 | 11/1975 | Chapman | 360/17 |
| 3,961,946 | 6/1976 | Makino et al. | 75/172 |
| 3,982,276 | 9/1976 | Roos | 360/17 |
| 4,061,824 | 12/1977 | Deffeyes et al. | 428/328 |
| 4,101,938 | 7/1978 | Hanai | 360/16 |
| 4,237,189 | 12/1980 | Deffeyes | 428/457 |
| 4,237,506 | 12/1980 | Manly | 360/135 |
| 4,277,806 | 7/1981 | Jeffers et al. | 360/16 |
| 4,281,043 | 7/1981 | Deffeyes | 428/457 |
| 4,332,834 | 6/1982 | Takei | 427/48 |
| 4,363,038 | 12/1982 | Fayling | 360/17 |
| 4,442,159 | 4/1984 | Deazawa et al. | 428/212 |
| 4,486,496 | 12/1984 | Deazawa et al. | 428/328 |
| 4,501,774 | 2/1985 | Miyazawa et al. | 427/215 |
| 4,506,000 | 3/1985 | Kubota et al. | 430/39 |
| 4,554,606 | 11/1985 | Karashima et al. | 360/131 |
| 4,578,280 | 3/1986 | Greiner et al. | 427/47 |
| 4,578,313 | 3/1986 | Ito et al. | 428/403 |
| 4,609,971 | 8/1986 | Ido et al. | 428/328 |
| 4,624,894 | 11/1986 | Kishimoto | 428/328 |
| 4,636,433 | 1/1987 | Kubo et al. | 428/328 |
| 4,657,816 | 4/1987 | Siddiq | 428/403 |
| 4,671,828 | 6/1987 | Yamauchi et al. | 148/309 |
| 4,683,012 | 7/1987 | Yamauchi et al. | 148/301 |
| 4,714,654 | 12/1987 | Ito et al. | 429/328 |
| 4,735,848 | 4/1988 | Kondo et al. | 428/219 |
| 4,743,490 | 5/1988 | Fayling | 428/212 |
| 4,755,888 | 7/1988 | Hori et al. | 360/16 |
| 4,851,258 | 7/1989 | Kuroyama et al. | 427/127 |
| 4,851,289 | 7/1989 | Ogawa et al. | 428/329 |
| 4,895,758 | 1/1990 | Sakemoto et al. | 428/323 |
| 4,898,922 | 2/1990 | Shiraki | 528/60 |
| 4,907,103 | 3/1990 | Hiller | 360/59 |
| 4,911,997 | 3/1990 | Asai et al. | 428/329 |
| 4,929,514 | 5/1990 | Natarajan et al. | 428/611 |
| 4,969,962 | 11/1990 | Watanabe et al. | 148/306 |
| 4,981,719 | 1/1991 | Schulz et al. | 427/128 |

FOREIGN PATENT DOCUMENTS

| | | |
|---|---|---|
| 3219778 | 12/1982 | Fed. Rep. of Germany . |
| 53-/020506 | 2/1978 | Japan . |
| 55-/088307 | 7/1980 | Japan . |
| 56-/093123 | 7/1981 | Japan . |
| 59-/215704 | 12/1984 | Japan . |
| 61-043226 | 3/1985 | Japan . |
| 60-/115024 | 6/1985 | Japan . |
| 60-/150236 | 8/1985 | Japan . |
| 61-250836 | 11/1986 | Japan . |
| 62-/033323 | 2/1987 | Japan . |
| 62-/211902 | 9/1987 | Japan . |
| 62-/250517 | 10/1987 | Japan . |
| 63-/159224 | 7/1988 | Japan . |
| 01/282130 | 11/1989 | Japan . |
| 02/024832 | 1/1990 | Japan . |
| 02/247819 | 10/1990 | Japan . |
| 8003926 | 1/1981 | Netherlands . |

OTHER PUBLICATIONS

Journal of Applied Physics, vol. 67, No. 9, Part II, pp. 5175-5177.
IEEE Transactions on Consumer Electronics, vol. CE-30, No. 3, pp. 397-401.
"Tribology and Mechanics of Magnetic Storage Devices", Bharat Bhushan, Springer-Verlay, N.Y., 1990, pp. 897-906.
Polymer Preprints, vol. 29, No. 2, Sep. 1988, American Chemical Society, pp. 260-261.
Morthane Resins, Magnetic Mediums, Morton Thiokol, Inc, Chicago, Ill. 60606, undated.
Pfizer Pferromet Line Metallic Particles for Advanced Magnetic Media, Feb. 8, 1985.
Pfizer Pferromet 2000, Kanto Denka Kogyo Co., Ltd. Tokyo, Japan, Feb. 8, 1985.
High Purity Alumina, Sumitomo Chemical Co., Ltd., Osaka and Tokyo, Japan, undated.
Morthane Resins, Morthane CA-118, Morton Thiokol, Inc., Chicago, Ill., 60606, Jan. 1988.
Gafac Surfactants, Technical Bulletin 4220-010, GAF Corp., Chemical Division, New York, N.Y. 10020, undated.

Primary Examiner—Bernard Pianalto
Attorney, Agent, or Firm—Robert A. Gerlach

[57] ABSTRACT

A coating composition is provided for master media for anhysteretic transfer of magnetically recorded information to a copy medium which comprises from about 50 to about 69% of a magnetic pigment, from about 2.95 to about 6.90% of an abrasive powder, from 0 to about 5.4% of a colloidal inorganic powder, from about 2.9 to about 4.5% of a wetting agent, from about 0.7 to about 3.1% of a lubricant, from about 14.1 to about 33.6% of a binder, at least 85% of which is a polyurethane and from 0.05 to about 15% of which is a polyisocyanate crosslinking agent. The composition is preferably disposed on a substrate backcoated with a composition containing from about 15 to about 25% of carbon black, from about 15 to about 25% of an inorganic filler, from about 0.5 to about 2% of an abrasive, from about 20 to about 30% of a vinyl copolymeric binder, from about 15 to about 25% of a polyurethane binder, from about 7.5 to about 17.5% of an NCO terminated crosslinking agent, from about 0.9 to about 2% of a lubricant, and from about 0.06 to about 0.6% of a coating aid. Master media for anhysteretic recording containing the coating composition of the invention and an anhysteretic duplicating system are also provided as are processes for preparing the coating compositions and master media and for anhysteretic duplication.

29 Claims, No Drawings

COATING COMPOSITIONS FOR MASTER MEDIA FOR ANHYSTERETIC RECORDING

The invention relates to unique coating compositions suitable for preparing master media for anhysteretic recording and a process for making them. More particularly, the invention relates to coating compositions which provide master media having superior durability and anhysteretic recording characteristics notwithstanding surface roughness and coercivities significantly less than three times those of copy media.

BACKGROUND OF THE INVENTION

Conventionally, contact printing has been used as a system for the high speed duplication of audio and/or video signals prerecorded on a master. In contact printing, the master medium must have a coercivity three times higher than that of the copy tape. To attain high duplicating speeds, generally more than one hundred times normal speed, the master and copy are wrapped around something like a transfer drum so that the coated surfaces of each face one other. Air pressure is generally used to press the master and copy together and a bias field is applied using a stationary transfer bias head. The mirror image of the magnetic pattern on the master becomes transferred onto the copy.

Devices for printing or copying signals by tape-to-tape copying processes from a master magnetic tape on which the signals are already recorded in a mirror image to a slave or copying magnetic medium such as a tape using either a magnetic printing or thermal printing method have been described, for example, in U.S. Pat. Nos. 3,592,977; 4,755,888 and the like. Other devices for anhysteretic recording are also known for tape-to-tape copying as well as for copying from a tape to photographic film base or from magnetically recorded layers onto transparent magnetic layers on a copying substrate such as transparent magnetic layers in the cellulose acetate base of photographic film.

Currently available master tapes which provide sufficient signal to transfer a mirror image to a copy medium, particularly a photographic layer, are quite fragile. When attempts were made to record to photographic film, the commercial master failed so quickly that it was not possible to evaluate the record/playback apparatus to be used. The commercial master was brittle and had poor adhesion to base with particularly rapid failure at the edges.

To function adequately, a master must not only have high durability but it must also function without scratching or otherwise damaging the magnetic, photographic, or other layers of the copying medium. High coercivity (2000 Oe) master tapes are generally used with low coercivity (650 Oe) copy media.

Further, the master must function without "pre-exposure" of the receiving sensitized layers due to sparks from electrostatic discharge of charges accumulated during the transport and transfer processes when film webs are driven, brought together, and parted at high speed. In magnetic transfer from a master to a magnetic film base, such problems are resolved by back coating the master with a conductive layer, preferably a thin and durable conductive carbon containing layer. However, mobile components transfer from the magnetic layer and back coat on contact with the receiving medium during high speed copying. While such mobile coponents as well as volatile molecules or particulate debris in the air flow do not generally present a significant problem during transfer to magnetic receiving media, they are quite detrimental to a photographic layer since static changes anywhere in the system can destroy the photographic properties of a photosensitive layer.

SUMMARY OF THE INVENTION

It has now been found that coating compositions for high durability, non-brittle, and adherent master media for anhystereitic transfer of magnetically recorded information to a copy medium, particularly to a photographic layer, comprise from about 59 to about 69% of a magnetic pigment, preferably from about 64 to about 68%, most preferably 64%; from about 2.9 to about 6.9% of an abrasive powder, preferably from about 3.8 to about 5.4, most preferably 5.36%; from 0 to about 5.5% of a colloidal inorganic powder, preferably from about 1 to about 3%, most preferably 1.34%; from about 2.9 to about 4.5% of a wetting agent, preferably from about 3.3 to about 4.4, most preferably 3.8%; from about 0.7 to about 3.1% of a lubricant, preferably from about 0.8 to about 2.3, most preferably 1.54%, from about 14.1 to about 35.6% of a binder, preferably from about 20 to about 25.5%, most preferably 21%, at least about 85% of which is a polyurethane and from 0.05 to about 15% of which is a polyisocyanate crosslinking agent, preferably about 10%. (All percentages of the components of the coating composition described herein are by weight based on the total dry weight of the coating composition except the polyurethane and crosslinking agent, which are percent by weight of the binder.)

The coating compositions of invention can be disposed on a substrate or support, preferably back-coated with a composition containing from about 15 to about 25% of carbon black, from about 15 to about 25% of an inorganic filler, from about 0.5 to about 2% by weight of an abrasive, from about 20 to about 30% of a vinyl copolymer binder, from about 15 to about 25% of a polyurethane binder, from about 7.5 to about 17.5% of a crosslinking agent, from about 0.9 to about 2% of a lubricant, from about 0.06 to about 0.6% of a coating aid. All percentages are by weight of the dry weight of the backcoating which is preferably applied to provide a dry coating thickness of from: about 0.3 to about 1.5 microns, most preferably about 0.5 micron. The backcoating composition is applied as a dispersion, preferably containing from about 8 to about 15% by weight of solids, most preferably 10%, in any suitable solvent such as any of those described herein, preferably mixtures thereof, most preferably approximately 4:3:3 mixtures of methylethylketone: methylisobutylketone:cyclohexanone.

Backcoating compositions which obviate the problems caused by electrostatic charges which arise during the transport and transfer processes generally in signal transfer to a magnetic film base do not behave satisfactorily when a signal is being transferred to a photographic layer. The backcoating of the invention obviates pre-exposure problems associated with sparks from electrostatic discharge of charges accumulated when webs are driven, brought together, and parted at high speed. Problems arising from mobile component transfer including volatile molecules or particulate debris in the air which can be detrimental to a photographic receiving layer are obviated then the backcoat of the invention is used.

The master media of the invention have good durability and electrical and recording performance characteristics. The master media of the invention, which generally have a coercivity of at least about 2000 Oe, efficiently and effectively transfer signals to copy media having coercivities ranging as high as from about 850 to about 1000 Oe. The master media of the invention have similar output characteristics to known high coercivity master tapes but, because they provide thinner coatings, the master media of the invention have better overwrite. They also have superior adhesion to substrates, particularly polyester substrates whether subbed or unsubbed, with none of the brittleness noted with prior master media. Also, the ability to use a thicker film base improves handling and transport characteristics. In addition, scratches and other damage to copying media, particularly the magnetic layers of cellulose acetate or polyester photographic film base, are reduced or prevented using the master media of the invention.

The magnetic coating compositions of the invention are prepared by an essentially three-step process involving a wet-out stage, a grind stage, and a let-down stage. The process involves wetting out by mixing magnetic pigment, abrasive powder, colloidal inorganic or carbon powder, and wetting agent with a solvent, grinding the wet-out mixture, letting down the wet-out/grind mixture by adding binder, lubricant and polyisocyanate crosslinking agent thereto and, optionally, milling further at reduced rpm, or "poliishing" the resulting dispersion.

In this process, the polishing step is preferred. Further, the magnetic pigment is preferably wetted with a solvent containing dissolved wetting agent before it is mixed with the abrasive powder, colloidal inorganic powder, and, optionally, the remainder of the solvent. It is also preferred that the binder is added in solution and that the binder is added to the wet-out/grind mixture before the lubricant and crosslinking agent. It is further preferred that the polished dispersion is filtered in the preparation of a coating composition of the invention.

The resulting dispersion of any suitable solids content in any suitable solvent or solvent mixture can then be coated onto a suitable substrate and the magnetic particles oriented before the coated substrate is dried, calendered, and wound up. Preferably, the dispersions contain from about 60 to about 75 weight %, preferably 68 weight %, based on the total weight of the dispersion, of a solvent, preferably a mixture of tetrahydrofuran, cyclohexanone, methylethyl ketone, and toluene. Most preferably the solids content ranges from about 27–33 percent.

DETAILED DESCRIPTION OF THE INVENTION

The performance properties of the master media of the invention are impressive. Signal strength using direct recording mode for the master tapes is within +/− 1-2 db compared to a video master tape. Also the signal strength of a copy medium which was written or encoded using anhysteric transfer from the master medium but read directly from the copy or slave medium using a benchmark recording head is better than direct recording and playback of the copy medium using a benchmark recording head. A master of the invention is equivalent electrically to master tapes such as Sony Mirror Mother when reading the anhysteretically recorded copy and because of the thinness of the coating (about 2-2.8 microns) compared to Sony Mirror Mother (about 4-5 microns), the overwrite of the master media of the invention is about 8-10 db better than Sony Mirror Mother. The master media of the invention also have better durability and adhesion of the magnetic layers than prior master tapes.

The master media of the invention tend to be smoother than known master tapes. However, they can be provided with a much rougher surface than master tapes used heretofore. This helps get rid of striction problems while still providing good transfer of longer wave length information.

Polyester supports for the master media of the invention are generally from about 1.3 to about 3 mils thick or 2-4 times thicker that prior master tapes. This provides the master media of the invention with a robustness and durability as well as handling and transport characteristics heretofore unattainable.

The master media of the invention are also capable of transferring recorded signals efficiently and effectively to receiving media having coercivities higher than those used heretofore. This may in part be due to the ability to record at lower frequencies or longer wavelengths than video tapes or masters. Such a result was unexpected. The ratio of coercivity of master to slave in the practice of the invention is about 2 to 1.

Coating compositions of the invention can be prepared using any suitable materials of the classes specified herein or mixtures thereof and any suitable equipment. Generally, from about 59–69%, preferably 64–67%, most preferably 67 dry weight % of any suitable magnetic pigment mixture can be used to prepare the coating compositions of the invention. Total pigment content greatly influences the physical properties of the tape. Too low a pigment content (binder rich) gives higher stick-slip tendency when the tape is run against the head, or against various transport mechanisms that move and direct the tape. Too high a pigment content produces a tape that is fragile because it is too brittle. The relationship between magnetic pigment content and electrical properties is straightforward: the higher the pigment content, the higher the electrical signal. Also, the higher the abrasive pigment content (e.g. alumina) and the larger the abrasive particles, the greater than contribution of the media to the total electrical noise. This kind of noise, however, does not appear to impact the performance of the master tapes of the invention since the wavelength of the magnetic information is significantly greater than the abrasive particle diameter.

A useful magnetic particle in the practice of the invention has a coercivity, Hc, equal to or greater than about 2000 Oe, the highest possible saturation magnetization (emu/g), and a specific surface area (SSA) ranging from about 50–60 m$^2$/g.

Any suitable pigment can be used including pure iron or an alloy of Fe, Co, Ni, Co-Ni, Co-Pt, Co-Ni-Pt, Fe-Co, Fe-Ni, Fe-Ni-Co, Fe-Co-B, Co-Ni-Fe-B, Co-Cr, chromium dioxide, doped, modified, coated magnetic particles or pigments and mixtures thereof. Metallic iron, preferably needle-like particles having a metallic iron core surrounded by a passivity shell of iron oxide (largely $Fe_2O_3$) which prevents the particle from spontaneously catching fire when exposed to air, is preferred. The magnetic properties of such particles can be thought to be a weighted average of the properties of pure iron and the iron oxide. Pferromet PK2000, available from Harcross Pigments, Easton, Pa. 18042-1497, is an example of a most preferred pigment.

The magnetic pigment, abrasive powder, and colloidal inorganic powder, are first wetted with a suitable solvent using any suitable wetting agent or dispersant. Components such as the abrasive powder and/or the colloidal inorganic, which is preferably carbon black, can be added as dry powders but are preferably added as predispersed slurries. Preferably, the abrasive dispersion is stabilized with a small amount of the hydroxy terminated polyurethane binder to be employed. Generally, amounts of the polyurethane as small as from about 2-4 weight percent based on the weight of the solids in the abrasive dispersion are adequate. The use of a small amount of a wetting agent as defined herein has also been found advantageous. Generally, amounts as small as from about 1-3 weight percent of wetting agent based on the weight of the solids in the abrasive dispersion are adequate.

Generally, from about 2.95 to about 6.9%, preferably 3.8-5.4%, most preferably 5.36 dry weight %, of any suitable abrasive material can be employed. Typically, fine inorganic particles are used such as, for example, aluminum oxide, silicon carbide, chromium trioxide, diamond, artificial diamond, garnet, emery and the like and mixtures thereof having an average particle diameter of from about 0.1 to about 2 microns and a specific surface area (SSA) ranging from about 1 to about 15 $m^2/g$ can be used. Alumina, particularly crystalline alpha alumina is preferred because it has the appropriate hardness and shape, is readily dispersible, and widely available in the preferred 0.1-0.6 micron diameter range which allows the tops of the particles to protrude from the tape surface and exert their "cleaning" action on the head.

Upon to about 5.4%, preferably 1-3%, and most preferably 1.34 dry weight %, of any suitable colloidal inorganic powder and mixtures thereof can be used in the preparation of the coating compositions of the invention provided that carbon black is a component thereof. Preferably, up to about 2.68%, preferably 1.34 dry weight % of colloidal carbon (carbon at 43 $m^2/g$) is used as the colloidal inorganic powder. Conductive carbon black, furnace carbon, channel carbon, acetylene carbon, thermal carbon, lamp carbon, commercially available carbon blacks such as Elftex 12, Sterling R, and Cabot XC-72 (Cabot Corp. Boston, Mass. 01821) and Accufluor CFx (Allied Engineered Materials, Morristown, N.J. 07960), and the like and mixtures thereof are preferred.

Inorganic pigments, conductors, extenders and the like such as alumina having a particle diameter of from about 0.01 to about 0.04 micron and a specific surface area (SSA) ranging from about 20 to about 300 $m^2/g$ can also be used as an inorganic colloidal component. Alpha FeOOH, alpha $Fe_2O_3$, $Cr_2O_3$, $TiO_3$, ZnO, $SiO_2$, $SiO_2.2H_2O$, $Al_2O_3.2SiO_2.2H_2O$, $3MgO.4SiO_2.H_2O$, $CaCO_3$, $MgCO_3$, $Sb_2O_3$, commercial counterparts such as Aluminium Oxid C, Aerosil 200, and Aerosil 972 (Degussa Corp. Pigments Div, Teterboro, N.J. 17608) and the like and mixtures thereof and the like can also be used. Alumina, particularly less dense gamma-$Al_2O_3$, is preferred, e.g., Oxid. C. The colloidal inorganic materials improve durability and control surface roughness. They are too small to act as abrasives but capable of acting as spacers, as extenders to reinforce the polymer matrix, or as dispersion aids.

Generally, from about 2.9 to about 4.5%, preferably 3.3-4.5%, most preferably about 3.8 dry weight %, of any suitable wetting agent and mixtures thereof can be employed. As used herein, the term wetting agent is intended to include dispersants and any other expedients which facilitate the dispersion of the magnetic particles and other compounds of the coating compositions of the invention in solvent provided that one component of the wetting agent is a phospholipid, preferably lecithin, and another is a complex organic phosphate fatty acid ester, preferably a mixture of mono- and di-alkarylpolyoxy ethylene phosphoric acid esters. Most preferably, the wetting agent includes a mixture of mono and diesters of the formulae

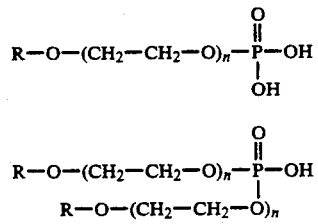

wherein R is

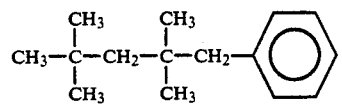

and n is 9. Preferably the ratio of mono to diester ranges from about 3-6 to 1 (average ratio about 4-1), so that the effective molecular weight of the mixture is about 815.8 g/mol. In the most preferred embodiment of the invention, the wetting agent comprises 2.9-4.14 dry weight % lecithin, preferably 3.55%, and a trace amount (0-0.72 dry weight %) of the phosphoric acid ester mixture described above, preferably 0.11%. Other suitable wetting agents that can be used include dodecylbenzenesulfonic acid and any of the wetting agents disclosed, for example, in U.S. Pat. No. 4,407,901 which is hereby incorporated herein by reference. Lecithin and acid phosphate esters such as Gafac RE610 (GAF Corp., N.Y., N.Y. 10020) are preferred since they provide excellent dispersions without interfering with the crosslinking reaction, particularly at the preferred concentrations.

Some materials which operate as lubricants in the practice of the invention as well as suitable wetting agents include, for example, fatty acids having alkyl or alkenyl groups having 11 to 17 carbon atoms including caprylic acid, capric acid, lauric acid, myristic acid, palmitic acid, stearic acid, oleic acid, elaidic acid, linoleic acid, stearolic acid, and the like; an ester of the above fatty acids having, for example, from 1 to 20 carbon atoms in the ester group, preferably 1 to 4, such as methyl laurate, butyl myristate, ethyl linoleate, propyl stearate, butyl palmitate, and the like; a metallic soap of the above fatty acids with an alkali metal such as lithium, sodium, potassium and the like or an alkaline earth metal such as magnesium, calcium, barium and the like; a compound containing fluorine of the above fatty acid esters, amides of the above fatty acids, polyalkylene oxide alkyl phosphoric acid esters, trialkyl polyolefinoxy quaternary ammonium salts, particularly those having alkyl groups having from 1 to 5 carbon atoms; polyolefins such as polyethylene, polypropylene, and the like; higher alcohols having 12 or more carbon atoms; sulfuric acid esters and so on.

Any suitable solvent can be employed in the preparation of the coating compositions of the invention. Generally from about 60 to about 75%, preferably about 60% by weight of solvent based on the total weight of the dispersion, of any organic solvent or solvent mixture normally used for the preparation of dispersions is suitable for this purpose. Some suitable solvents include ketones such as methylethylketone, methylisobutylketone, cyclohexanone; alcohols; esters such as methyl acetate, ethyl acetate, butyl acetate, ethyl lactate, cellosolves; ethers such as acetate acid glycol monoethyl ether, glycol dimethylether, glycolmonoethylether, dioxane; aliphatic and aromatic hydrocarbon solvents such as benzene, toluene, xylene, tetrahydrofuran, hexane, heptane; chlorinated hydrocarbons such as methylene chloride, ethylene chloride, carbon tetrachloride, chloroform, ethylene chlorohydrin, dichlorobenzene, and the like and mixtures thereof. Cyclohexanone, methylethylketone, tetrahydrofuran, and toluene are preferred and a mixture of from 1-2 parts of tetrahydrofuran, 59-63 parts of methylethylketone, 30-33 parts of cyclohexanone, and 6 parts of toluene is most preferred.

Any other suitable solvent or solvent mixture can be used that will dissolve binders, lubricants and other organic species and keep them dissolved until the coating is almost completely dry. The solvent should evaporate at a proper rate given the coating speed and dryer conditions used, with some slight solvent retention to assist during calendering. In combination with dispersants, the solvent should wet the pigments in the dispersion, have low toxicity, low cost, be easy to recover, and evaporate slowly during the milling and filtering operations. A combination of tetrahydrofuran, methylethylketone, cyclohexanone, and toluene worked well in the process of the invention.

Preferably, the magnetic pigment, abrasive powder, colloidal inorganic powder, and wetting agent are wetted with the solvent and dispersed therein using a high speed disk disperser such as a Cowles blade fixed to a shaft, preferably operated at a minimum tip speed of about 4000 ft/min. The wetting/dispersing operation is preferably carried out in an inert atmosphere containing no more than about 5% oxygen, preferably 1-3% oxygen, using a glove box or any other such suitable expedient, preferably equipped with a monitoring device to assist in oxygen manipulation and an alarm bell. Caution is observed during this operation since metallic iron particles of high surface area are pyrophoric and are being introduced into a large quantity of highly flammable organic solvent.

The wetting/dispersing operation is continued for a suitable time, generally from about 1 hour to about 48 hours, and preferably about 24 hours when the preferred components of the invention are employed. Preferably, the wetting/dispersing operation is continued until aggregates no larger than about 0.1 mm are obtained. This not only assists the media milling process but also insures that no large, dry clumps of pigment have escaped being wet with solvent.

The proportions of the components in a typical wet-out composition are generally as follows:

| | range | g total preferred | range | % of dry weight preferred |
|---|---|---|---|---|
| SOLIDS | | | | |
| Magnetic pigment | 443.0–464.2 | 450 | 85–89 | 86.49 |
| Abrasive powder | 18.2–51.2 | 36 | 3.5–10 | 6.91 |
| Colloidal | 0–41.7 | 9 | 0–8 | 1.73 |
| Wetting agent | 10.4–36.5 | 25.47 | 2–7.2 | 4.88 |
| Total dry | | 520.49 | | 100.00 |
| SOLVENTS | | | | |
| Methylethylketone | 400–550 | 506.22 | | |
| Cyclohexanone | 350–500 | 404.96 | | |
| Toluene | 50–200 | 101.24 | | |
| Tetrahydrofuran | 0–100 | 0 | | |
| Total solvent | | 1012.42 | | |
| Total Weight | 1532.89 | | | |
| Percent solids | 34.00 | | | |

The wet-out composition is then milled (which term is intended to include grinding, kneading and any other such suitable operations) in any suitable apparatus such as a small media mill, bead mill, Eiger mill, Netzsch mill, or the like. The milling apparatus is preferably loaded with glass beads (e.g., diameter of 1.0 to 1.3 mm).

Milling is carried out carefully in such a manner as to avoid breaking particles due to overmilling. A B/H meter can be used to record the hysteresis loops in order to monitor the dispersion. Initially, the metal pigment particles are tightly aggregated, even sintered, but are individually porous and fragile once separated. The consequence of breakage is to produce small particles of low coercivity which would switch in the applied transfer field and be useless in the practice of the invention. Such particles dilute the effective particles in the tape product resulting in lower signal-to-noise ratios.

Particles can be broken using too long a residence time (too many passes, too long total milling time), too high a tip speed (rpm), substitution of steel or ceramic beads for glass beads, lower mill base viscosity (lower solids, higher dispersant levels), and so on. Under-milling produces poor filterability because pigment is stripped from dispersion as filter cake with the result that the tape product contains a lower pigment concentration than intended.

The aim of the dispersion process is to reduce the aggregates of metal particles (which have a primary particle length of preferably about 0.2 micron) by orders of magnitude in size. For example, if the original dry metal pigment granules at 5–10 an (500010,000 micron), then the diameter of the wet out pigment aggregates may be 0.1 mm (100 micron) and the milled pigment may be less than 5 and usually less than 1 micron in diameter to provide thin coatings. To achieve this, the composition is milled or ground in a small media mill for about 3 hours at about 14 meters/sec tip speed and filtered through a 5 micron filter. Particular attention should be paid to the RPM or tip speed of the mill and the time or number of passes through the mill.

The grind phase composition which is the same as the wet-out composition is then "let down" with a binder solution, lubricant, and crosslinking agent added slowly to the grind composition. The "let down" should be carried out as slowly and with as much stirring/shear action as practical. Simply dumping the binder solution into the grind phase composition can produce "colloidal shock" which is a reaggregation phenomenon that may be irreversible, even with additional milling. In a system already sensitive to overmilling, colloidal shock can be catastrophic.

Preferably, the binder is added first followed by lubricant, crosslinking agent, and other minor additions which may be desired. Binder solutions preferably have a solids content ranging from about 10–25% in any suitable solvent, including any of those already described herein (75–90% solvent). Generally from about 14.12 to about 33.56%, preferably from about 18.73 to about 22.71%, most preferably about 18.87 dry weight % of the coating of any suitable polyurethane binder can be used, preferably an hydroxyl terminated polyurethane, more preferably an hydroxy terminated polyester polyurethane, most preferably an hydroxy terminated polyethylene terephthalate polyurethane. The polyurethane preferably has a molecular weight ranging from about 10,000 to about 200,000, more preferably a number average molecular weight ($m_n$) of from about 20,000 to 50,000, most preferably a minimum $m_n$ of from about 25,000 to about 30,000.

Some suitable polyurethanes which can be used include those prepared by reacting isocyanates with an excess of compounds containing active hydrogen atoms such as polyhydroxy polyols, polyesters, polyethers, polyetheresters and the like. Long chain diols and short chain glycols can be used such as polyester diols, polycarbonate diols, polyether diols and the like. Preferred are polyester diols obtained by the polycondensation of a polybasic acid such as adipic acid, succinic acid, azelaic acid, sebacic acid, phthalic acid, isophthalic acid, terephathalic acid and the like with a polyhydric alcohol such as 1,4-butanediol, ethylene glycol, diethylene glycol, propylene glycol, 1,2-propylene gylcol, dipropylene glycol, 1,6-hexane glycol, cyclohexanedimethanol, neopentyl glycol and the like or lactone-type compounds obtained by ring-opening polymerization of a lactone such as epsilon caprolactone. Polyesters of adipic acid, isophthalic acid, hexanediol, cyclohexandimethanol and butanediol are preferred. Particularly preferred is a mixture of a polyester of adipic acid, isophthalic acid and hexanediol (36:14:50 mol%) and cyclohexanedimethanol or an 85:15 mol % mixture of a polyester of adipic acid, isophthalic acid, hexanediol and cyclohexanedimethanol (25:10:35:30 mol %) and hexanediol and/or cyclohexanedimethanol. Most preferred are polyesters which contain units derived from butanediol and adipic acid. Preferred polycarbonate polyols are prepared by the polycondensation of 1,6-hexanediol with diethyl carbonate or diphenyl carbonate. Preferred polyether polyols include polyethylene ether glycol, polypropylene ether gylcol, polytetramethylene ether glycol, copolymerized polyether glycol of polytetramethylene ether glycol and the like.

Any suitable isocyanate can be reacted with the active hydrogen containing compound to prepare the polyurethane binder of the coating compositions of invention including polyisocyanates prepared by reacting an excess of a polyisocyanate with a polyhydroxy compound including aromatic, aliphatic, alicyclic, alkaryls, aralkyls, and the like and mixtures thereof. Preferred polyisocyanates include organic diisocyanates such as tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compound such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. Tolylene diisocyanate and diphenylmethane diisocyanate are preferred.

From about 0.01 to about 5.03%, preferably from about 0.01 to about 2.68 dry weight %, most preferably 2.1 dry weight % based on the dry weight of the coating, of any suitable polyisocyanate crosslinking agent can be employed including any of those polyisocyanates described above and particularly polyisocyanates prepared by reacting an excess of a polyisocyanate with any suitable polyhydroxy compound as disclosed above. Preferred polyisocyanate crosslinking agents have a molecular weight ranging from about 150 to about 7,000. Most preferred is an adduct of trimethylol propane and tolylene diisocyanate. The crosslinking agent is preferably added in solution at any desired concentration in one of the coating composition solvents.

As used herein, the term "crosslinking" refers to reaction between isocyanate groups and ambient water to form an interpenetrating polymer network. An effective amount of any suitable catalyst which will initiate the NCO/HOH reaction can be used to catalyze the crosslinking reaction including stannous octoate, stannous oleate, dibutyltin dilaurate, tertiary amines, ferric acetonyl acetate, and the like and mixtures thereof.

Generally from about 0.7 to about 3.1%, preferably 0.8 to about 2.3%, most preferably 1.54 dry weight % of any suitable lubricant can be employed in the preparation of the coating compositions of the invention provided that the lubricant provides a suitable coefficient of fraction and provided that one of the lubricants is a fatty acid and another is a fatty acid ester. A static coefficient of fraction of 0.1 to about 0.3 and a dynamic coefficient of friction of from about 0.04 to about 0.1 are preferred.

Any suitable fatty acid and fatty acid ester can be used in a preferred embodiment of the invention with butyl myristate and myristic acid preferred. Most preferably, about 0.77 dry weight % of butyl myristate and about 0.77 dry weight % of myristic acid are employed. The lubricant is preferably added in solution at any desired concentration in one of the solvents of the invention.

Some other suitable lubricants include, for example, fatty acids having alkyl or alkenyl groups having 11 to 17 carbon atoms including caprylic acid, capric acid, lauric acid, myristic acid. palmitic acid, stearic acid, oleic acid, elaidic acid, linoleic acid, stearolic acid, and the like; an ester of the above fatty acids having, for example, from 1 to 20 carbon atoms in the ester group, preferably 1 to 4, such as methyl laurate, butyl myristate, ethyl linoleate, propyl stearate, butyl palmitate, and the like; a metallic soap of the above fatty acids with an alkali metal such as lithium, sodium, potassium and the like or an alkaline earth metal such as magnesium, calcium, barium and the like; a compound containing fluorine of the above fatty acid esters, amides of the above fatty acids, polyalkylene oxide alkyl phosphoric acid esters, trialkyl polyolefinoxy quaternary ammonium salts, particularly those having alkyl groups having from 1 to 5 carbon atoms; polyolefins such as polyethylene, polypropylene, and the like; higher alcohols having 12 or more carbon atoms; sulfuric acid esters and so on.

The component additions are made slowly to avoid "colloidal shock" as described above and the dispersion is milled for a short period of time, preferably from about 15 to about 30 minutes, in a polishing step. For smooth, uniform, and durable tapse, the polished dispersion must be filtered, preferably through a 5 micron "absolute" PALL filter (available from PALL Trinity Corp., Cortland, N.Y., 13045), before it is coated onto a suitable support.

The proportions of the components in a typical letdown composition of the invention are generally as follows:

| SOLIDS | g added range | g added preferred | g total preferred | % dry weight preferred |
|---|---|---|---|---|
| Magnetic pigment | 0 | 0 | 450 | 67 |
| Abrasive powder | 0 | 0 | 36 | 5.36 |
| Colloidal | 0 | 0 | 9 | 8.34 |
| Wetting agent | 0 | 0 | 25.47 | 3.8 |
| Lubricant | 5-30 | 10.34 | 10.34 | 1.54 |
| Binder | 80-200 | 125.67 | 125.67 | 18.87 |
| Crosslinker | 1-20 | 14.08 | 14.08 | 2.10 |
| Total dry | | | | 100.01 |

| SOLVENTS | g added preferred | g total preferred |
|---|---|---|
| Tetrahydrofuran | 34.54 | 34.54 |
| Methylethylketone | 512.76 | 1018.98 |
| Cyclohexanone | 164.97 | 598.94 |
| Toluene | 2.38 | 103.62 |
| Total solvent | 714.65 | 1727.08 |
| Total Weight | | 2398.72 |
| Percent solids | | 28.00 |

The dispersions can be coated at any suitable thickness onto any suitable support or substrate having any suitable thickness using any suitable method. Preferably the dispersion is coated onto a 1.3 to 3 mil subbed polyester film base back-coated with a conductive carbon containing layer using an extrusion hopper, roll coater, gravure printer or other suitable method.

Other suitable supports which can be used include films of synthetic resins such as polyesters including polyethylene terephthalate, modified polyethylene terephthalate such as polyethylene terephthalate coextruded with silica or filled polyethylene terephthalate, polyethylene-2,6-naphthalate; polyolefins such as polyethylene, polypropylene; cellulose derivatives such as cellulose triacetate, cellulose diacetate, cellulose acetate butyrate, cellulose acetate propionate; polyvinyl resins such as polyvinyl chloride, polyvinylidene chloride; polycarbonates; polyamides; polyimides; metals such as aluminum, copper, tin, zinc, or a non-magnetic alloy containing them; ceramics such as glass, earthware, porcelain; barytes or papers such as paper spread coated or laminated with an alpha polyolefin and the like.

The substrate can take any form including film, tape, sheet, disc, card, drum, and so on, particularly any form having a carbon containing backcoating, particularly a preferred carbon backcoating of the invention.

Carbon backcoatings of the invention generally contain from about 15 to about 25% of carbon black, from about 15 to about 25% of an inorganic filler, from about 0.5 to about 2% by weight of an abrasive, from about 20 to about 30% of a vinyl copolymeric binder, from about 15 to about 25% of a polyurethane binder, from about 7.5 to about 17.5% of a crosslinking agent, from about 0.9 to about 2% of a lubricant, and from about 0.06 to about 0.6% of a coating aid. All percentages are by weight of the dry weight of the backcoating which is preferably applied to provide a dry coating thickness of from about 0.3 to about 1.5 microns, most preferably about 0.5 micron. The backcoating composition is applied as a dispersion, preferably containing from about 8 to about 15% by weight of solids, most preferably 10%, in any suitable solvent such as any of those described herein, preferably mixtures thereof, most preferably approximately 4:3:3 mixtures of methylethylketone:methylisobutylketone:cyclohexanone. The backcoating layer can be applied by any suitable method using any suitable applicator means including an extrusion hopper, roll coater, gravure printer or the like.

More particularly, preferred carbon backcoatings of the invention contain from about 15 to about 25%, most preferably 19% by weight of any suitable carbon black such as those already described herein. The backcoating contains from about 15 to about 25%, preferably 19% by weight of any suitable inorganic filler such as any of the colloidal inorganic powders described herein, preferably a soft inorganic filler. Any of the silicates, oxides such as titanium dioxide, zinc oxide, and the like, carbonates such as sodium carbonate, potassium carbonate, calcium carbonate, magnesium carbonate, barium carbonate, and the like and mixtures thereof can be used. Calcium carbonate is most preferred.

Preferred backcoatings of the invention contain from about 0.5 to about 2% by weight, most preferably 1.5% of any suitable abrasive, particularly any of those already described herein most preferably alpha alumina having a diameter in the range of 0.1–0.6 micron and a specific surface area ranging from about 1 to about 15 $m^2/g$.

Preferred backcoatings of the invention contain from about 20 to about 30% of a copolymeric vinyl binder, particularly a polyvinylchloride/polyacetate binder containing hydroxyl and/or carboxyl functional groups. Preferably, the vinyl binder contains (A) from about 6 to about 18% by weight, most preferably about 11.6%, of a carboxy modified vinyl chloride/vinyl acetate copolymer and (B) from about 9 to about 20%, most preferably about 14.5%, of an hydroxy modified vinyl chloride/vinyl acetate copolymer.

Preferred copolymer A is a 90:5 vinyl chloride:vinyl acetate copolymer containing carboxy groups (maleic acid) and having a number average molecular weight of about 28,000 and a Tg of 80 C. The copolymer is hydrolyzed to an hydroxy equivalent weight of about 850 g/g mol and has an hydroxyl content of about 2.3% by weight. Copolymer B is an hydroxy modified (6% hydroxy as vinyl alcohol) polyvinyl chloride:polyvinyl acetate (91:03) copolymer having a number average molecular weight of about 23,000 and a Tg of 79 C.

Preferred backcoatings of the invention contain from about 15 to about 30%, most preferably about 20.4% of any suitable polyurethane binder including those disclosed in U.S. Pat. No. 2,871,218 which is hereby incorporated herein by reference, any of those disclosed hereinbefore, particularly a polyether or polyester polyurethane, most preferably a polyester polyurethane. The most preferred polyurethane binder in the practice of the invention is a thermoplastic adduct of adipic acid, butanediol, and 4,4'-diphenylmethane diisocyanate having a weight average molecular weight of about 124,000.

A preferred backcoating of the invention contains from about 7.5 to about 17.5%, most preferably about 12.3% of a suitable crosslinking agent. Any of the crosslinking agents described herein can be used. An NCO terminated adduct of trimethylol propane and tolylene diisocyanate (1:3) is particularly preferred.

Preferred backcoatings of the invention also contain from about 0.9 to about 2% of any suitable lubricant as already disclosed herein. More preferably, about 1.4% of any suitable fatty acid ester, most particularly a mixture of fatty acid esters, is employed. A most preferred fatty acid ester lubricant mixture is about a 4:2:2:6 mixture of butyl stearate, isocetyl stearate, tridecyl stearate, and ethylhexyl palmitate, respectively.

A preferred coating of the invention will contain from about 0.06 to about 0.6%, most preferably 0.13%, of any suitable coating aid such as, for example, those disclosed in U.S. Pat. No. 4,916,054, hereby incorporated herein by reference, and the like. Preferred are orgnofunctional silicone fluids such as silicone carbinols. The most preferred coating aid of the invention as used in Example 5 is a silicone carbinaol having secondary alcohol functionality, a weight % OH of 0.9-1.1, and the formula

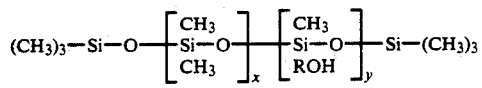

where x and y are any integers providing an average of 3 hydroxyl groups per molecule, an average hydroxyl equivalent weight of about 2000, a weight average molecular weight of about 6,000, and R is an alkyl group having 5-20 carbon atoms, preferably 10.

The preferred backcoating of the invention is prepared as described in Example 5.

The amount of the magnetic dispersion to be coated or applied to the substrate should yield a dry film thickness ranging from about 2 to about 3 microns. Coating compositions of the invention have better durability and adhesion of the magnetic layer to base compared to Sony Mirror Mother. The thinness of the coatings of the invention also provides improved overwrite characteristics, about 8-12 db better than Sony Mirror Mother.

The magnetic particles on the coated substrate can then be oriented, for example, by an orienting magnet immediately after the substrate is coated. The oriented coated substrate can then be dried, calendered, cured, and stored. When the substrate is a film, preferably a subbed polyester support, the coating is redried and recalendered and wound onto spools at low tension to reduce embossing patterns from being transferred through the wound media. After curing, for example at about 55 degree C. for a suitable time (e.g., 0, 3 ½, 7 days), the coated film can be slit to the desired dimension. Three and a half days cure time is optimum for the coatings of the invention.

Master tapes thus prepared have a high coercivity, about 2000 Oe, and are capable of transfering signals to a lower coercivity copy medium (about 850 to 1000 Oe). The master tapes have high durability and good electrical and recording performance. The adhesion of the magnetic coating to the base is superior to prior master tapes.

The master media of the invention can have any other form suitable for containing signals to be duplicated one or multiple times to a suitable copy medium without erasing the signals from the master.

Master media of the invention are particularly suitable for use in an anhysteretic duplicating system in which signals are transferred to suitable copy media including video tapes, the transparent magnetic layers in photographic film base, particularly cellulose acetate and polyethylene terephthalate film base, cards, discs and the like. Such processes are described, for example, in U.S. Pat. Nos. 3,782,947; 4,279,945; and 4,363,035 which are hereby incorporated herein by reference, and the like.

A preferred system for anhysteretic duplicating includes means for impressing a magnetic recording pattern on master media of the invention, a copy medium capable of becoming remanently magnetized when an external magnetic field is impressed thereon, means for temporarily maintaining the master and copy medium in surface contact with substantially no relative movement in the machine or transverse direction between them, and a power source to apply an AC bias magnetic field to the contacted media or a laminated permanent magnet array, thereby promoting duplication of the magnetic pattern from the master to the copy medium without erasing the pattern on the master. Preferably, the copy medium is a photographic film containing a transparent magnetic layer or layers in the photographic film base to duplicate a pattern or signal from the master. Most preferably, the photographic film base is cellulose acetate or polyethylene terephthalate, and the like.

A preferred process of the invention for the anhysteretic duplication of a signal from a master to a copy medium includes impressing a magnetic recording pattern on a master recording medium of the invention, providing a copy medium capable of becoming remanently magnetized when an external magnetic field is impressed thereon, temporarily maintaining the master and copy magnetic media in surface contact with substantially no relative movement between them, and applying an AC bias magnetic field to the contacted media to promote duplication of the magnetic signals from the master medium to the copy medium without erasing the pattern on the master.

The invention is further illustrated but is not intended to be limited by the following examples in which all parts and percentages are by weight unless otherwise indicated.

EXAMPLE 1

The wet out stage, grind stage, and let down stage including the polishing step and post preparation filtration of the process of the invention and the wet out and let down compositions of the invention are illustrated.

Stock solutions and dispersions were prepared as follows: Cyclohexanone (C), tetrahydrofuran (THF), methylethylketone (MEK) and toluene (T) were filtered through a 5 micron polypropylene filter and used to prepare stock solutions as in Table 1.

TABLE 1

| Solute | Solution % | Solvent Mixture | | | |
|---|---|---|---|---|---|
| | | THF | MEK | C | T |
| A - Lubricant Stock Solution | | | | | |
| Butyl myristate | 25 | 100 | 0 | 0 | 0 |
| Myristic acid | 25 | | | | |
| B - Binder Stock Solution | | | | | |

TABLE 1-continued

| Solute | Solution % | Solvent Mixture | | | |
|---|---|---|---|---|---|
| | | THF | MEK | C | T |
| Polyurethane (1) | 20 | 0 | 90 | 10 | 0 |
| C - Crosslinking Agent Stock Solution | | | | | |
| Polyisocyanate (2) | 50 | 0 | 100 | 0 | 0 |

(1) A linear hydroxy terminated polymer of butanediol-adipate and diphenylmethane diisocyanate having a molecular weight of 20,000–50,000 and a Tg of 58–61 C (Morthane CA118, Morton Thiokol, Inc, Chicago, IL 60606).
(2) An adduct of trimethylolpropane and tolylene diisocyanate (1:3) (Mondur CB-75, Mobay Chemical Corp, Pittsburgh, PA 15205).

D - Abrasive Stock Dispersion

A dispersion of alpha alumina having a median particle diameter of 0.38 micron and a specific surface area of 6 $m^2/g$ (or Alumina AKP30 available from Sumitomo Crop. Chuo-ku, Tokyo, Japan) in 11 parts MEK and 89 parts of C contained 57% by weight of solids. As weight % of solids, the dispersion contained 95.24% of alumina, 1.9% of the 4:1 mixture of mono- and dialkarylethyleneoxy esters of phorphoric acid (or Gafac RE610 available from GAF Corp. New York, N.Y. 10020), and 2.86% of polyurethane(1).

E - Carbon Black Stock Dispersion

A carbon black dispersion containing 31% by weight of solids in 50 parts of MEK, 40 parts of C and 10 parts of T was also prepared. The carbon black dispersion comprised 96.15% of Elftex 12 (available from Cabot Corp. Boston, Mass. 02110) and 3.85% of Centrolex P (available from Central Soya, Fort Wayne, Ind. 46802).

The abrasive and carbon dispersion were each prepared by ball milling using known procedures.

Wet Out Stage

Metallic iron particles of high surface area are pyrophoric in ambient air. Accordingly, cans of raw pigment chucks were opened in a large glove box from which oxygen had been purged with nitrogen gas until the atmosphere contained less than 3% oxygen. An oxygen analyzer and audible alarm system were used to monitor the atmosphere in the glove box continuously throughout the wet out process. For small scale experiments (e.g., two kilograms of dispersion), the solvent-wetted pigment slurry could subsequently be exposed to air without concern. For pilot scale experiments (e.g., thirty kilograms of dispersion), the complete wet out process should be conducted in an inert atmosphere (97-98% nitrogen, 3-2% oxygen).

A glove box purged with nitrogen as described above was used. Solvent comprising about 492.66 g MEK, 391.26 g C, and 99.16 g T were placed in a grounded metal container and mixed with about 24.4 g of lecithin (Centrolex P) using a Cowles type disperser. Then, 450 g of metallic iron magnetic pigment (Pferromet PK2000) were carefully added to the container with continuous stirring using the Cowles blade. The abrasive stock dispersion (66.31 g) and about 30.19 g of carbon black stock dispersion (Elftex 12) were added to the resulting slurry at this stage.

After being mixed for two hours, the slurry was sealed and allowed to stand for from 4 to 24 hours.

Grind Stage

The slurry was transferred to a funnel on a small media mill (Eiger Machinery Inc. Model 250) which was loaded with 85% by volume of glass beads having a diameter of 1 to 1.3 mm.

The dispersion was mixed continuously using a Cowles blade in the funnel/reservoir to which the mill base was recirculated for 3 hours in the mill at 14 m/sec rotor tip speed.

The progress of milling of the dispersion was monitored at half hour intervals by microscope examination at 100 x of a small sample drawn down on a fineness of Grind Gauge, and by measuring the B/H meter hysteresis loop of a dry hand coated sample transferred to adhesive tape. The latter is the most sensitive method for determining whether primary particles have been broken in the milling step.

Let Down Stage

The stock binder solution (628.3 g at 20% solids) was diluted with a solvent mixture containing 24.2 g THF, 46.28 g MEK, 114.7 g C, and 2.38 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the probability of fracturing the pigment particles.

When the addition of the binder is complete, the stock lubricant mixture of 1:1 w/w myristic acid/butyl myristate (20.7 g) was slowly added. The resulting dispersion was then "polished" at a tip speed of about 10 m/sec for about thirty minutes. The dispersion quality parameters were again assessed by microscopic examination at 100 x of the draw down on a fineness of grade gauge to confirm the absence of oversized particles or flocculation of the dispersion. In addition, the shape of the hysteresis loop and its derivative can be used to assess coercivity squareness and absence of particle breakage.

The crosslinking agent stock solution (28.2 g) was then slowly stirred into the dispersion with continued milling for 10 minutes after addition was complete.

The dispersion was then removed from the mill and filtered through a 6 micron absolute rating polypropylene woven filter (PALL Trinity Corp. Cortland, N.Y. 13045).

EXAMPLE 2

The wet out stage, grind stage, and let down stage procedures outlined in Example 1 were followed except that the solvent mixture for the wet out stage contained 505.77 g MEK, 404.62 g C, and 101.16 g T with 24 g of lecithin (Centrolex P) dissolved therein. About 49.75 g of the alumina stock dispersion and 60.39 g of the carbon black dispersion were used in the wet out stage.

The grind stage was repeated as described in Example 1.

In the let down stage, stock binder solution (630.5 g at 20% solids) was diluted with a solvent mixture containing 24.2 g THF, 45.16 g MEK, 114.88 g C, and 2.47 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing pigment particles.

The remainder of the procedure of Example 1 was followed.

EXAMPLE 3

The wet out shape, grind stage, and let down stage procedures outlined in Example 1 were followed except that the solvent mixture for the wet out stage contained 470.66 g MEK, 376.53 g C, and 94.13 g T with 21 g of lecithin (Centrolex P) dissolved therein. Then, 420 g of metallic iron granules (Pferromet PK2000) were carefully added to the solvent/lecithin solution with continuous stirring using a Cowles type disperser. Thereafter, about 42.61 g of the alumina stock dispersion and 56.36 g of the carbon black dispersion were used in the wet out stage process described in Example 1.

The grind stage was repeated as described in Example 1.

In the let down stage, stock binder solution (741.3 g at 20% solids) was diluted with a solvent mixture containing 7.64 g THF, 100.46 g MEK, 94.46 g C, and 12.32 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing pigment particles.

When the addition of the binder is complete, the stock lubricant mixture 1:1 w/w myristic acid/butyl myristate (20.2 g) was slowly added. The resulting dispersion was then "polished" at a tip speed of about 10 m/sec for about thirty minutes. The dispersion quality parameters were again assessed as described in Example 1.

The crosslinking agent stock solution (25.9 g) was then slowly stirred into the dispersion with continued milling for 10 minutes after addition was complete.

The remainder of the procedure of Example 1 was followed as described.

EXAMPLE 4

The wet out stage, grind stage, and let down stage procedures outlined in Example 1 were followed except that the solvent mixture for the wet outstage contained 8.93 g THF, 437.54 g MEK, 357.18 g C, and 89.29 g T with 20 g of lecithin (Centrolex P) dissolved therein. About 400 g of metallic iron granules (Pferromet PK 2000) were carefully added to the lecithin solution with continuous stirring using the Cowles blade. About 24 g of alumina having a median particle diameter of 0.38 micron and a specific surface area of $6m^2/g$ (Sumitomo AKP-30) abrasive powder and an aluminum oxide filler having a median crystallite diameter of about 0.02 micron and a specific surface area of 100 $m^2/g$ (Degussa Oxid C) were added to the metallic iron dispersion with stirring. After the slurry was mixed for about two hours, it was sealed and allowed to stand for from about 24 hours.

The grind stage was repeated as described in Example 1.

In the let down stage, stock binder solution (559.2 g at 20% solids) was diluted with a solvent mixture containing 12.58 g THF, 4.86 g MEK, 149.44 g C, and 2.82 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing of pigment particles.

When the addition of the binder is complete, the lubricant stock solution (18.4 g) was added slowly. The resulting dispersion was then "polished" at a tip speed of about 10 m/sec for about thirty minutes. The dispersion quality parameters were again assessed as described in Example 1.

The crosslinking agent stock solution (32 g) was then slowly stirred into the dispersion with continued milling for 10 minutes after addition was complete.

The remainder of the procedure of Example 1 was followed.

EXAMPLE 5

A subbed polyethylene terephthalate substrate having a thickness of about 1.3 mil or 33 microns is backcoated at a rate of about 2cc/ft$^2$ with a carbon dispersion having a 10% solids content using an extrusion die to provide a dry backcoat thickness of about half a micron.

The backcoating was prepared by ball milling about 175 g of carbon black, 175 g of carbonate 14 g of alumina abrasive, and about 428 g ofa 25% by weight solution in a abrasive, and about 428 g of a 25% by weight solution in a solvent mixture of a 90:5 vinyl chloride:vinyl acetate copolymer containing carboxyl (maleic acid) groups and having a number average molecular weight of about 28,000 and a Tg of 80 C. The copolymer is hydrolyzed to an hydroxy equivalent weight of about 850 g/g mol and the solvent mixture contains about 438 parts of methylethylketone (MEK), about 328.5 parts of methyl isobutylketone (MIBK), and about 328.5 parts of cyclohexanone (C). Milling was continued for about 72 hours at about 80 rpm. The solids content of the milled dispersion was about 25%.

About 360 g of a mixture of about 144 g of MEK, about 108 g of MIBK, about 108 g of C were added to the ball mill and mixed for about 5 minutes. The resulting dispersion was poured through a wire mesh strainer. The solids content is reduced to about 21% in this step.

About 558 g of a 15% solution in the above solvent mixture of a polyesterurethane having a weight average molecular weight of about 124,000 and prepared from adipic acid, butanediol, and 4,4'-diphenylmethane diisocyanate were added with mixing over about a two minute period for each 1000 g of the resulting 21% solids dispersion. Thereafter, about 237 g of a 25% solution in the above solvent mixture of an hydroxy modified (6% hydroxy as vinyl alcohol) vinyl chloride:vinyl acetate (91:03) copolymer having a number average molecular weight of about 23,000 and a Tg of 79 C were added wit mixing over about a two minute period for each 1000 g of the dispersion. The solids content was reduced to 20% in this step.

Sequentially, (1) about 3.2 g of a 4:2:2:6 mixture of butyl stearate, isocetyl stearate, tridecyl stearate and ethylhexyl palmitate; (2) about 0.3 g of a graft copolymer silicone polycarbinol having about 1 weight % of secondary alcohol functionality and average number of OH groups per molecular of 3, a viscosity of 160 cps and an average hydroxy equivalent weight of about 2000; and (3) about 38.2 g of an NCO terminated adduct of trimethylolpropane and tolylene diisocyanate, each in a small amount of the solvent mixture, are added per 1000 g of the 20% solids dispersion while stirring with a Cowles blade. Additional solvent mixture to total about 1280 g of solvent mixture was added while stirring with a Cowles blade. The mixture was polished in an Eiger mill for one pass at 3500 rpm shaft speed, filtered through a 3 inch Pall Sealkleen 5 micron absolute polypropylene cartridge, and contained about 10% nonvolatiles. The backcoat formula contained about 1.38% total lubricants, about 39.6% total pigments and about 59% total binders for a pigment/binder ratio of about 0.67 and a solids content of about 10% by weight.

Master media were prepared by applying magnetic dispersions of Examples 1-4 containing about 32% solids laid down at a rate of about 2 cc/ft$^2$ onto backcoated substrates as described above to provide a dry magnetic layer thickness for testing of about 2.5 microns.

The webs, freshly coated using an extrusion die, were passed through an orientation magnet to enhance the longitudinal orientation of the pigment (measured by B/H meter or VSM) and then conveyed through a series of driers before being calendered and wound upon a tape spool. The webs were subsequently passed through the driers and then calendared and rewound onto a core at reduced tension to prevent the formation of embossing patterns on winding up and subsequent curing at 55 C.

The coated and cured media were slit to ½ inch widths and tested for electrical performance, friction coefficient, and master-to-slave transfer. Excellent results were obtained which were, in all cases, far superior to those obtained using master tapes which are commercially available. The results of the adhesion tests are exemplary of the kind of test data obtained.

Adhesion Tests

Samples of the master media of the invention prepared as described above using the coating compositions of Examples 1-4 and samples of Sony Mirror Mother (V-½M-2M and V-½-4M as used in the Sony Sprinter, High Speed Video Duplicating System) were tested using procedures described in "Tribology and Mechanics of Magnetic Storage Devices" by Bharat Bhushan, Springer-Verlag, N.Y. 1990, page 898, paragraphs A4.1 to A4.1.2.

Test A. Scotch Tape Test—90 Degree Peel Method

A 5 inch long strip of half inch wide double sided tape was laid down on a backing plate. The magnetic layer containing side of about an 8 inch long half width of master tape to be tested is bonded to the double sided tape on the backing plate so that a length of about 3 inches remains free of the adhesive. The free end of the master tape is then pulled slowly away from the backing plate at an angle of about 90 degrees. The amount of material transferred from the master tape to the adhesive tape on the backing plate is measured. The area which delaminated divided by the area originally bonded to the adhesive tape surface and multiplied by 100 represents the percent delamination experienced by the test place.

Test B. Scotch Tape Test - 180 Degree Peel Method

A 5 inch long strip of half inch wide double sided tape was laid down on a backing plate. The magnetic layer containing side of about an 8 inch long half inch width of master tape to be tested is bonded to the double sided tape on the backing plate so that a length of about 3 inches remains free of the adhesive. The free end of the master tape is then pulled slowly away from the backing plate at an angle of about 180 degrees. The amount of material transferred from the master tape to the adhesive tape on the backing plate is measured. The area which delaminated divided by the area originally bonded to the adhesive tape surface and multiplied by 100 represents the percent delamination experienced by the test piece.

Test C. Scotch Tape Test - 90 Degree Adhesive Peel Method

Two strips of half inch wide double sided tape, each about 2 inches long, were laid down in line on a backing plate with about a one inch gap or strip of exposed backing plate between them. A 5 inch long strip of half inch wide master to be tested was laid on top of the two strips and across the gap between them with the back or non-magnetic layer surface down. Another strip of adhesive tape, half inch wide, seven inches long, was laid, with adhesive layer down on top of the magnetic layer of the master medium being tested. The excess length of the 7 inch long adhesive tape was peeled away at an angle of about 90 degrees. The amount of magnetic coating transferred to the adhesive tape from the unsupported section of tape over the gap was measured. The area which delaminated in the unsupported area divided by the area of the unsupported section and multiplied by 100 represents the percent delamination experienced by the test piece.

Ten tests were performed for each tape type. No delamination was observed for any of the samples of the invention. Delamination results for the Sony Mirror Mother V-½M-4M, Serial No. 0206110071, samples is contained in Table I. In particular, the mode of failure of the Song Mirror Mother tape in Test C appeared to be more complex than in Test A and B. In Test C, the delamination was less than in Test A or B but the areas that did not delaminate showed a significant amount of cracking in the magnetic layer with cracks in a direction across the width of the tape. This phenomenon was not observed in any of the tapes of the invention.

TABLE I

| Test A | Test B<br>% Delamination | Test C |
|--------|--------------------------|--------|
| 99.2   | 99.2                     | 4.49   |
| 99.2   | 99.7                     | 80.0   |
| 99.2   | 99.7                     | 88.8   |
| 99.3   | 99.9                     | 15.4   |
| 99.1   | 99.3                     | 57.7   |
| 99.5   | 99.9                     | 23.8   |
| 94.9   | 100.0                    | 71.4   |
| 99.7   | 99.9                     | 46.0   |
| 99.9   | 100.0                    | 90.0   |
| 89.1   | 99.9                     | 91.7   |

Any of the components mentioned as suitable herein can be substituted for its counterparts in the foregoing examples with similar results.

Although the invention has been described in considerable detail in the foregoing, it is to be understood that such detail is solely for the purpose of illustration and that variations can be made by those skilled in the art without departing from the spirit and scope of the invention except as set forth in the claims

What is claimed is:

1. A coating composition for master media for anhysteretic transfer of magnetically recorded information to a copy medium which comprises from about 59 to about 69% by weight of a magnetic pigment, from about 2.95 to about 6.90% by weight of an abrasive powder, from 0 to about 5.4% by weight of a colloidal inorganic powder, from about 2.90 to about 4.5% by weight of a wetting agent, from about 0.7 to about 3.1% by weight of a lubricant, from about 14.1 to about 33.6% by weight of a binder, at least 85% by weight of which is a polyurethane and from 0.05 to about 15% by weight of which is a polyisocyanate crosslinking agent, wherein all percentages by weight are based on the total dry weight of the coating composition except the polyurethane and crosslinking agent, which are percent by weight of the binder.

2. The coating composition of claim 1 containing about 67% by weight of magnetic pigment.

3. The coating composition of claim 1 containing about 5.36% by weight of abrasive powder.

4. The coating composition of claim 1 containing about 1.34% by weight of colloidal carbon black powder.

5. The coating composition of claim 1 containing about 3.80% by weight of wetting agent.

6. The coating composition of claim 1 containing 1.54% by weight of a lubricant.

7. The coating composition of claim 1 containing 21% by weight of a binder.

8. The coating composition of claim 1 containing 10% by weight of the binder of a polyisocyanate crosslinking agent.

9. The coating composition of claim 1 wherein the polyurethane binder is an adduct of diphenylmethane diisocyanate with an excess of a polyester having a molecular weight of 10,000-200,000.

10. The coating composition of claim 9 wherein the polyurethane is an adduct of diphenylmethane diisocyanate and a polyester of adipic acid, isophthalic acid or mixtures thereof with butanediol, hexanediol, cyclohexanedimethanol or mixtures of any of them.

11. The coating composition of claim 10 wherein the polyurethane is an adduct of diphenylmethane diisocyanate and a polyester of butanediol and adipic acid, and has a molecular weight of 20,000 to 100,000.

12. The coating composition of claim 10 wherein the polyurethane is an adduct of diphenylmethane diisocyanate and a polyester of adipic acid and isophthalic acid with hexanediol and cyclohexanedimethanol.

13. The coating composition of claim 1 wherein the polyisocyanate crosslinking agent is an adduct of trimethylolpropane and tolylene diisocyanate (1:3).

14. The coating composition of claim 1 wherein the colloidal inorganic powder is carbon black.

15. The coating composition of claim 1 wherein the lubricant is a mixture comprising a fatty acid and a fatty acid ester.

16. The coating composition of claim 15 wherein the lubricant is a mixture of myristic acid and butyl myristate.

17. The coating composition of claim 1 wherein the wetting agent is a mixture of lecithin and an acid phosphate ester mixture of the formula $$R-O-(CH_2-CH_2-O)_n-\overset{\overset{O}{\|}}{\underset{OH}{P}}-OH$$

$$R-O-(CH_2-CH_2-O)_n-\overset{\overset{O}{\|}}{\underset{R-O-(CH_2-CH_2-O)_n}{P}}-OH$$

wherein R is

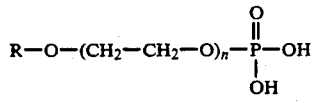

and n is 9 and the ratio of mono to diester ranges from about 3-6 to 1 to provide an effective molecular weight of the phosphate ester mixture of about 815.8 g/mol.

18. The coating composition of claim 1 comprising about 67% by weight of a magnetic pigment, about 5.36% by weight of an abrasive powder, about 1.34% by weight of a colloidal inorganic powder, about 3.8% by weight of a wetting agent, about 1.54% by weight of a lubricant, about 21% by weight of a binder, at least 85% by weight of which is a polyurethane and about 10% by weight of which is a polyisocyanate crosslinking agent, wherein all percentages by weight are based on the total dry weight of the coating composition except the polyurethane and crosslinking agent, which are percent by weight of the binder.

19. A process for preparing the coating composition of claim 18 which comprises wetting out magnetic pigment by mixing magnetic pigment, abrasive powder, colloidal inorganic powder and wetting agent with a solvent, grinding the wet-out mixture, letting down the grind mixture by adding binder, lubricant and polyisocyanate crosslinking agent thereto, and polishing the let-down mixture.

20. The coating comosition of claim 1 comprising about 64% by weight of magnetic iron particles, about 4.90% by weight of alumina abrasive powder, about 1.4% by weight of a colloidal carbon black, about 3.55% by weight of lecithin, about 0.11% by weight of an acid phosphate ester mixture of the formula $$R-O-(CH_2-CH_2-O)_n-\overset{\overset{O}{\|}}{\underset{OH}{P}}-OH$$

$$R-O-(CH_2-CH_2-O)_n-\overset{\overset{O}{\|}}{\underset{R-O-(CH_2-CH_2-O)_n}{P}}-OH$$

wherein R is

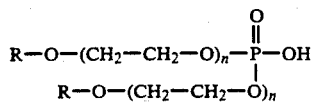, n is 9, and the ratio of mono to diester averages about 4 to 1 to provide an effective molecular of the mixture of about 815.8 g/mol, about 0.77% by weight of butyl myristate, about 1.54% by weight of myristic acid, about 21% by weight of a binder, at least 85% by weight of which is an hydroxy terminated polyester polyurethane and about 10% by weight of which is an isocyanate terminated adduct of trimethylol propane and tolylene diisocyanate, wherein all percentages by weight are based on the total dry weight of the coating composition except the polyurethane and crosslinking agent, which are percent by weight of the binder.

21. The coating composition of claim 1 which comprises from about 64 to about 68% by weight of a magnetic pigment, from about 3.8 to about 5.4% by weight of an abrasive powder, from 1 to about 3% by weight of a colloidal inorganic powder, from about 3.3 to about 4.4% by weight of a wetting agent, from about 0.8 to about 2.3% by weight of a lubricant, from about 20 to about 25.5% by weight of a binder, at least 85% by weight of which is a polyurethane and from 0.05 to about 15% by weight of which is a polyisocyanate crosslinking agent, wherein all percentages by weight are based on the total dry weight of the coating composition except the polyurethane and crosslinking agent, which are percent by weight of the binder.

22. The coating composition of claim 1 comprising from about 59 to about 69% by weight of magnetic iron particles; from about 2.95 to about 6.90% by weight of an alumina abrasive powder; from 0 to about 5.4% by weight of a colloidal carbon black powder; from about 2.9 to about 4.14% by weight of lecithin; up to about 0.72% by weight of an acid phosphate ester mixture of the formulae

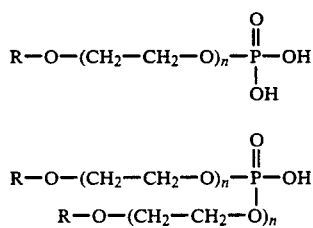

wherein R is

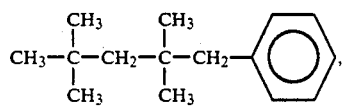

n is 9, and the ratio of mono to diester averages about 4 to 1 to provide an effective molecular weight of acid ester mixture of about 815.8 g/mol; about 0.77% by weight of butyl myristate, from about 0.77 to about 2.31% by weight of myristic acid; from about 14.1 to about 33.6% by weight of a binder, at least 85% by weight of which is an hydroxy terminated polyester polyurethane and from 0.05 to about 15% by weight of which is an isocyanate terminated adduct of trimethylol propane and tolylene diisocyanate, wherein all percentages by weight are based on the total dry weight of the coating composition except the polyurethane and crosslinking agent, which are percent by weight of the binder.

23. A process for preparing the coating composition of claim 1 which comprises wetting out the magnetic pigment by mixing magnetic pigment, abrasive powder, colloidal inorganic powder and wetting agent with a solvent, grinding the wet-out mixture, letting down the grind mixture by adding binder, lubricant and polyisocyanate crosslinking agent thereto, and polishing the let-down mixture.

24. The process of claim 23 which comprises polishing the let-down mixture by grinding for from about 15 to about 30 minutes.

25. The process of claim 24 which comprises filtering the polished mixture through a 5 micron absolute filter.

26. The process of claim 23 which comprises mixing the magnetic particles with solvent before mixing the abrasive powder, colloidal inorganic powder and wetting agent.

27. The process of claim 23 which comprises dissolving the binder in solvent before adding the binder to the grind mixture.

28. The process of claim 23 which comprises adding the binder to the grind mixture before adding the lubricant and crosslinking agent.

29. The process of claim 23 which comprises filtering the polished let-down mixture.

* * * * *